US012658766B2

(12) United States Patent
Jang et al.

(10) Patent No.: US 12,658,766 B2
(45) Date of Patent: Jun. 16, 2026

(54) MOTOR HAVING COOLING STRUCTURE

(71) Applicants: Hyundai Motor Company, Seoul (KR); Kia Corporation, Seoul (KR)

(72) Inventors: Hyung Kwan Jang, Uijeongbu-si (KR); Hoo Dam Lee, Seoul (KR); Kyung Sik Choi, Seoul (KR); Jun Hyeok Choi, Suwon-si (KR); Tae Gyu Lee, Seoul (KR); Byung Ho Min, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 239 days.

(21) Appl. No.: 18/374,511

(22) Filed: Sep. 28, 2023

(65) Prior Publication Data

US 2024/0405641 A1     Dec. 5, 2024

(30) Foreign Application Priority Data

Jun. 2, 2023     (KR) ........................ 10-2023-0071792

(51) Int. Cl.
| | |
|---|---|
| *H02K 9/19* | (2006.01) |
| *H02K 1/32* | (2006.01) |
| *H02K 9/20* | (2006.01) |
| *H02K 9/22* | (2006.01) |

(52) U.S. Cl.
CPC .............. *H02K 9/225* (2021.01); *H02K 9/20* (2013.01)

(58) Field of Classification Search
CPC ........... H02K 1/32; H02K 9/19; H02K 9/193; H02K 9/20; H02K 55/00; H02K 55/02; H02K 55/04; H02K 55/06
USPC ..................................................... 310/54, 61
See application file for complete search history.

(56) References Cited

U.S. PATENT DOCUMENTS

| | | | |
|---|---|---|---|
| 7,667,358 B2 | 2/2010 | Okazaki et al. | |
| 2007/0296287 A1* | 12/2007 | Okazaki ................. | H02K 55/04 |
| | | | 310/64 |
| 2012/0299404 A1* | 11/2012 | Yamamoto ............... | H02K 1/28 |
| | | | 310/61 |
| 2016/0164378 A1 | 6/2016 | Gauthier et al. | |
| 2017/0133912 A1* | 5/2017 | Gi ............................ | H02K 9/19 |
| 2018/0166950 A1 | 6/2018 | Lee et al. | |
| 2019/0097499 A1 | 3/2019 | Yim et al. | |
| 2021/0175779 A1 | 6/2021 | Kim | |
| 2021/0391762 A1 | 12/2021 | Chen et al. | |
| 2022/0337125 A1* | 10/2022 | Dang ....................... | H02K 9/22 |

FOREIGN PATENT DOCUMENTS

| | | |
|---|---|---|
| JP | 2003-0143810 A | 5/2003 |
| JP | 2014-087248 A | 5/2014 |
| KR | 10-2005-0064843 A | 6/2005 |
| KR | 10-2018-0066729 A | 6/2018 |

OTHER PUBLICATIONS

Jun. 10, 2024 —(EP) European Search Report—App 23213651.5.

* cited by examiner

*Primary Examiner* — Michael Andrews
(74) *Attorney, Agent, or Firm* — Banner & Witcoff, Ltd.

(57) ABSTRACT

A motor may include a stator with a coil disposed on an inner side thereof, a rotor at least partially surrounded by the coil and having an accommodation space in which a refrigerant for cooling the coil may be accommodated, a shaft connected to the rotor to rotate integrally with the rotor, and a pipe communicating with the accommodation space so that the refrigerant may be introduced from an external source and the refrigerant flows into the accommodation space therethrough.

13 Claims, 7 Drawing Sheets

MOTOR HAVING COOLING STRUCTURE

CROSS-REFERENCE TO RELATED APPLICATION(S)

This application claims the benefit of Korean Patent Application No. 10-2023-0071792 filed on Jun. 2, 2023, in the Korean Intellectual Property Office, the entire disclosure of which is incorporated herein by reference for all purposes.

TECHNICAL FIELD

The present disclosure relates to a motor having a cooling structure, and more particularly, to a motor having a cooling structure for cooling a coil using a refrigerant.

BACKGROUND

Electric vehicles or hybrid vehicles may be driven by a motor obtaining rotational force with battery power.

Such a motor may include parts for power, such as a permanent magnet, a core, and a coil. These parts may cause considerable heat due to electrical resistance or the like if the motor operates.

SUMMARY

The following summary presents a simplified summary of certain features. The summary is not an extensive overview and is not intended to identify key or critical elements.

Systems, apparatuses, and methods are described for a motor. The motor may include a stator with a coil disposed on an inner side thereof. The motor may further include a rotor at least partially surrounded by the coil. The motor may further include a shaft which may be connected to the rotor to rotate integrally with the rotor. The motor may further include a pipe which may be at least partially inserted into the shaft and through which a refrigerant for cooling the coil may flow. The pipe may rotate integrally with the rotor and the shaft.

These and other features and advantages are described below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The present disclosure may be modified variably and may have various exemplary aspects, particular examples of which will be illustrated in drawings and described in detail.

However, it is to be understood that the present disclosure is not limited to a specific disclosed form, but includes all modifications, equivalents, and substitutions without departing from the scope and spirit of the present disclosure.

Terms, such as 'first,' 'second,' etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure. As used here, the term "and/or" includes any and all combinations of one or more of the associated listed items Terms used in the present specification are used only in order to describe specific example aspects rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, examples in the present disclosure will be described with reference to the drawings.

An example motor 100 will be described with reference to FIGS. 1 to 3 and 4A to 4C.

Figure 1:
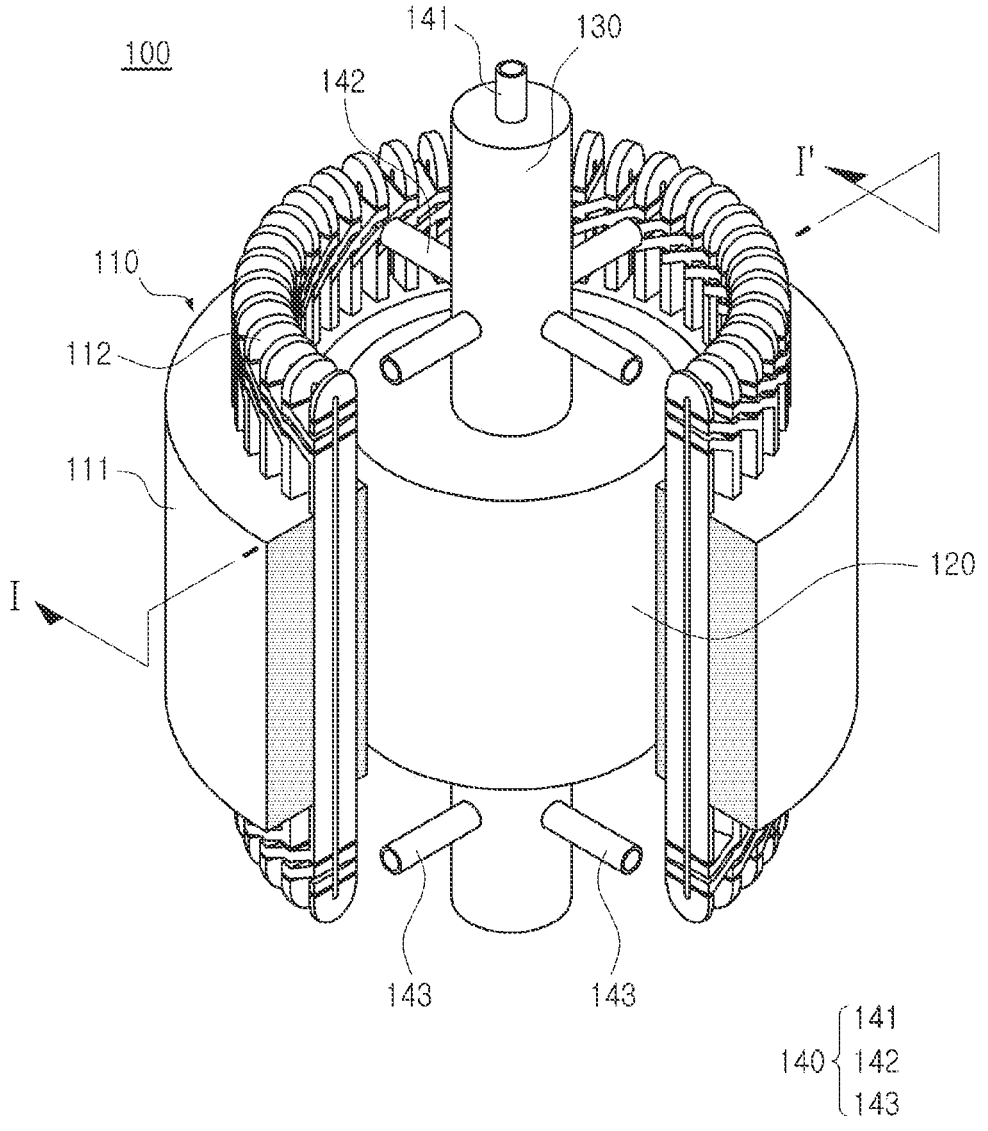
FIG. 1 is a perspective view of an example motor.

FIG. 1 is a perspective view of an example motor 100. For example, FIG. 1 is a view in which a portion of a stator 110 is cut to show a structure in which a rotor 120 is disposed inside the stator 110 of the motor 100.

Referring to FIG. 1, the motor 100 may be used in aircraft or vehicle, and may generate driving force by converting electrical energy into mechanical energy through an electromagnetic field. Aircraft may refer to a mobility vehicle that may move by flying in the sky. That is, aircraft may include a vehicle that may land on the ground or a basin using landing gear after flight, as well as referring to rotary wing aircraft, drones, tilt rotor aircraft, vertical take-off and landing aircraft, and fixed-wing aircraft. Also, aircraft may include manned aircraft and unmanned aircraft. Manned aircraft may include a body capable of operating autonomously, as well as a body controlled by a pilot.

Vehicles may include an electric vehicle (EV) or a hybrid electric vehicle (HEV). However, vehicles refer to various vehicles that move objects to be transported, such as people, animals, or objects, from a starting point to a destination. These vehicles are not limited to vehicles that drive on roads or tracks.

The motor 100 may include the stator 110, the rotor 120, a shaft 130, and a pipe 140.

The stator 110 may include a stator core 111 and a coil 112. The coil 112 may be wound around a portion (e.g., a tooth portion (not shown)) of the stator core 111. The rotor 120 may be disposed inside the stator 110.

The rotor 120 may rotate at the center of the motor 100. The rotor 120 may be disposed inside the stator 110. For example, a circumferential outer surface of the rotor 120 may be surrounded by the stator 110. The rotor 120 may be configured such that a permanent magnet (not shown) is inserted or attached therein. For example, the motor 100 may be referred to as a permanent magnet synchronous motor (PMSM) in which a permanent magnet is embedded (or inserted) into the rotor 120. As power is applied to the coil 112 of the stator 110, the rotor 120 may be driven to rotate based on an electromagnetic interaction generated between the coil 112 and the permanent magnet. However, the motor 100 of the present disclosure is not limited to the above example, and may be referred to as various types of motors including a synchronous reluctance motor (SynRM). For example, an electromagnet or a conductor bar may be disposed on the rotor 120. Also, for another example, the rotor 120 may be configured as a salient pole rotor.

The shaft 130 may rotate together with the rotor 120. The shaft 130 may transmit power based on rotation of the rotor 120 to the outside. If the rotor 120 rotates, the shaft 130 may be integrally coupled to the rotor 120 to be rotatable together with the rotor 120. For example, the shaft 130 may penetrate the center of the rotor 120 in a longitudinal direction of the shaft 130 to be coupled.

The pipe 140 may provide a refrigerant movement path for cooling the coil 112. The pipe 140 may have a hollow shape to enable inflow, movement, and/or outflow of the refrigerant. The pipe 140 may be coupled to the shaft 130. The pipe 140 may be inserted or embedded in the shaft 130 to move integrally with the shaft 130. For example, the pipe 140 may rotate together with the shaft 130 if the shaft 130 rotates. The pipe 140 may have a heat insulating structure. According to the present disclosure, by cooling the coil 112 using a cryogenic refrigerant, the cooling performance of the motor 100 is increased to reduce the size of the motor 100 and improve the specific power density and performance of the motor 100. For example, the cryogenic refrigerant may include, but is not limited to, liquid hydrogen, liquid nitrogen, liquid helium, and/or neon gas. In general, cryogenic temperatures may refer to very low temperatures, for example, equal to or lower than −150° C. (absolute temperature 123K).

The pipe 140 may include an inlet 141, a first outlet 142 extending from one side of the inlet 141, and a second outlet 143 extending from the other side of the inlet 141. A portion of each of the inlet 141, the second outlet 143, and the second outlet 143 may penetrate the outer circumferential surface of the shaft 130 and protrude to the outside of the shaft 130. One or more of the first outlet 142 and the second outlet 143 may be formed. The configuration of the pipe 140 will be described in more detail with reference to FIGS. 2 and 3 below.

Although not shown, the motor 100 may further include a housing (e.g., a housing 150 of FIG. 2) accommodating the rotor 120, the stator 110, the shaft 130, and the pipe 140, and forming the exterior of the motor 100. For example, the housing may have a storage space formed therein to surround other components of the motor 100. The inside of the housing may be in a vacuum state.

Figure 2:
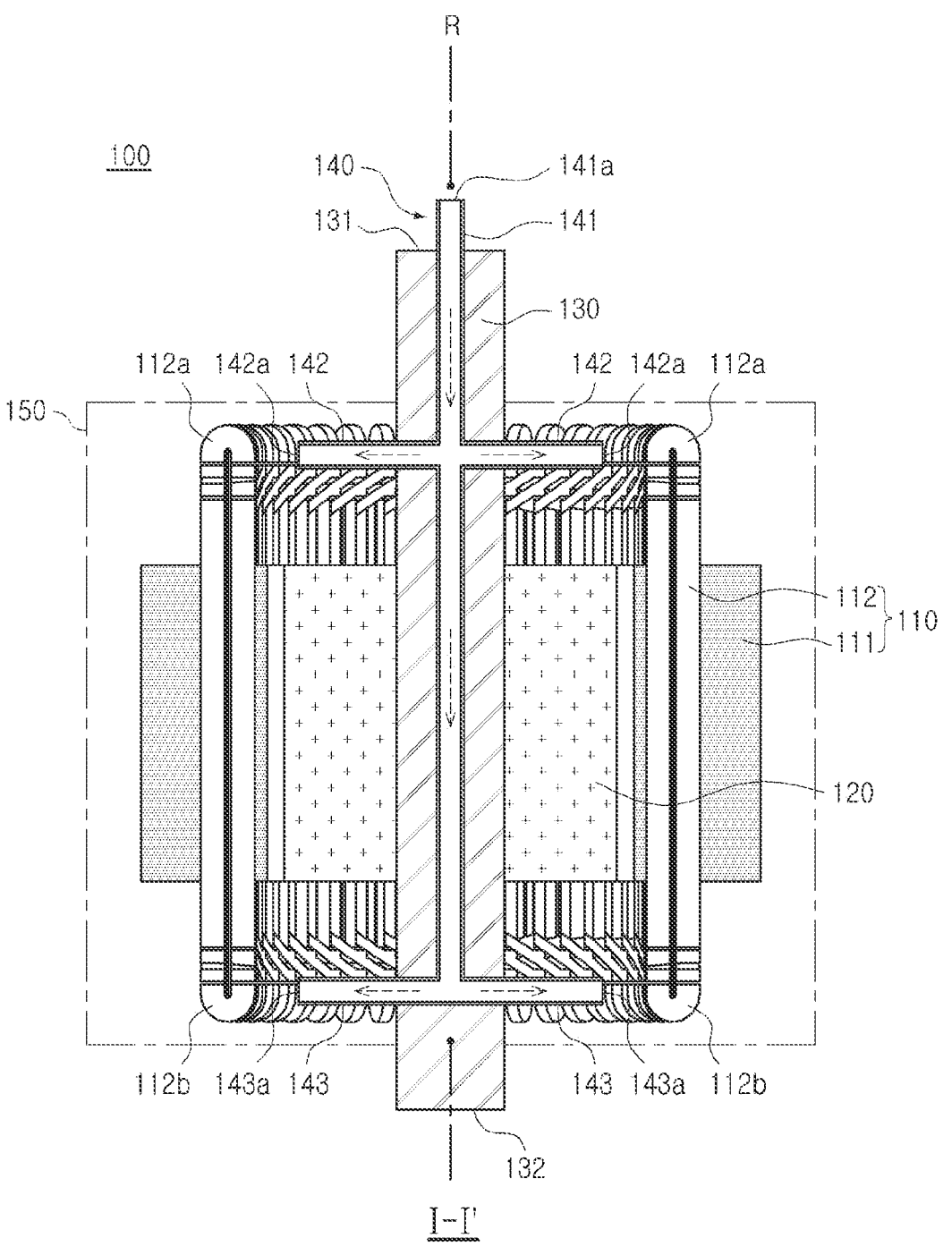
FIG. 2 is a cross-sectional view of the example motor illustrated in FIG. 1.
Figure 3:
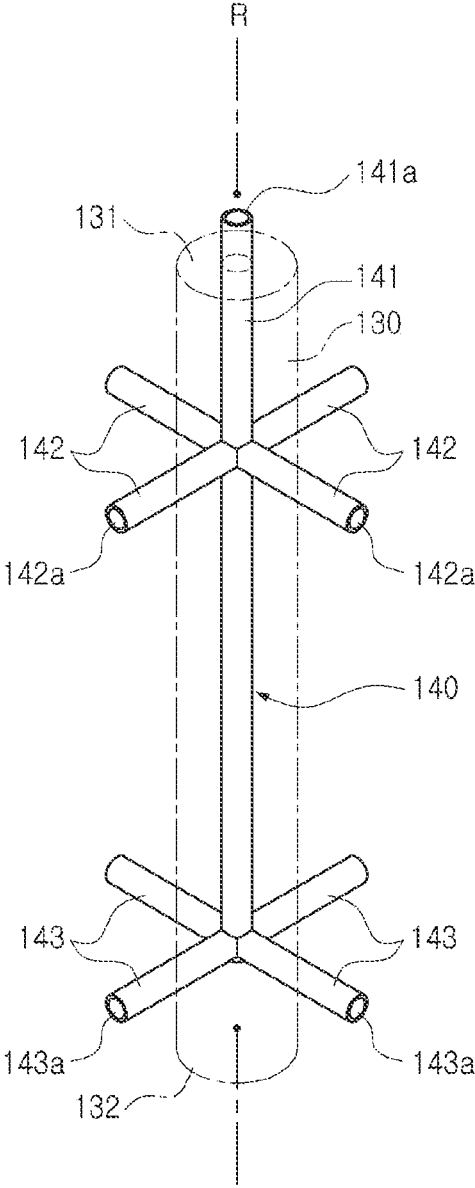
FIG. 3 is a view illustrating a shaft and a pipe of the example motor illustrated in FIG. 1.

FIG. 2 is a cross-sectional view of the motor 100 illustrated in FIG. 1. FIG. 3 is a view illustrating the shaft 130 and the pipe 140 of the motor 100 illustrated in FIG. 1. For example, FIG. 2 is a cross-sectional view taken along the line I-I' of FIG. 1, and FIG. 3 is a view illustrating a structure in which the pipe 140 is inserted into the shaft 130 and coupled thereto. FIG. 2 is a schematic view of the housing 150 accommodating other parts (e.g., the stator 110, the rotor 120, the shaft 130, and/or the pipe 140) of the motor 100.

Referring to FIGS. 2 and 3, the motor 100 may be configured such that the pipe 140 is inserted into the shaft 130 and integrally coupled thereto and a refrigerant flows in through the pipe 140 and/or moves to flow out to the coil 112 to cool the coil 112.

Hereinafter, in the description of FIGS. 2 and 3, the upper side or upper portion indicates a direction in which the inlet 141 of the pipe 140 protrudes from the shaft 130, and the lower side or lower portion indicates the opposite direction to the upper side or upper portion.

The stator 110 may be configured in a shape in which a plurality of coils 112 are arranged on the stator core 111. For example, the plurality of coils 112 may be fixedly arranged along the inner circumferential surface of the stator core 111. Both end portions 112a and 112b of the coil 112 may be exposed to the outside of the stator core 111. For example, the coil 112 may include a first end portion 112a facing upwardly and a second end portion 112b facing downwardly. In the present disclosure, a region adjacent to both end portions 112a and 112b of the coil 112 may be exposed to the outside of the stator core 111 in order to cool the coil 112 by directly spraying a refrigerant to the coil 112.

The pipe 140 may be inserted into the shaft 130 and the pipe 140 may penetrate through the shaft 130 to protrude from the outer circumferential surface of the shaft 130. The shaft 130 may include an upper end portion 131 and a lower end portion 132, and the pipe 140 may protrude from the upper end portion 131 of the shaft 130. The shaft 130 may rotate together with the rotor 120 about an axis of rotation R.

A portion of the pipe 140 may be inserted into the shaft 130 and another portion thereof may protrude out of the shaft 130 so that the refrigerant flows in and out, while the pipe 140 rotates together with the shaft 130. The pipe 140 may include an inlet 141 through which the refrigerant flows in and outlets 142 and 143 through which the refrigerant flows out. The inlet 141 and the outlets 142 and 143 may communicate with each other so that the refrigerant may move. For example, each of the inlet 141 and the outlet 142, 143 has a hollow shape, and a flow path through which the refrigerant may move may be formed therein, and a flow path of the inlet 141 and flow paths of the outlet 142 and 143 may be connected to each other. The outlets 142 and 143 of the pipe 140 may include a first outlet 142 and a second outlet 143 respectively corresponding to both end portions 112a and 112b of the coil 112. For example, the first outlet 142 may be located to be adjacent to the first end portion 112a of the coil 112 and spray the refrigerant to the first end portion 112a and the periphery of the first end portion 112a. The second outlet 143 may be located to be adjacent to the second end portion 112b of the coil 112 and may spray refrigerant to the second end portion 112b and the periphery of the second end portion 112b.

The inlet 141 of the pipe 140 may extend from the outside of the shaft 130 to the inside of the shaft 130 through the upper end portion 131 of the shaft 130. The inlet 141 may have a shape with one side open. For example, the inlet 141 may have an inlet hole 141a formed at an upper end portion so that a refrigerant may flow in therethrough and a lower end portion which is blocked. A portion of the inlet 141 in which the inlet hole 141a is formed may protrude from the upper end portion 131 of the shaft 130 and be exposed to the outside of the shaft 130.

The first outlet 142 of the pipe 140 may be disposed to correspond to the first end portion 112a of the coil 112 and may extend from one side (e.g., an upper portion) of the inlet 141. A first outlet hole 142a may be formed in the first outlet 142 so that the refrigerant may be sprayed toward the first end portion 112a of the coil 112. A portion of the first outlet 142 in which the first outlet hole 142a is formed may protrude from the outer surface of the shaft 130 and be exposed to the outside of the shaft 130. One or more first outlets 142 may be configured.

The second outlet 143 of the pipe 140 may be disposed to correspond to the second end portion 112*b* of the coil 112 and may extend from the other side (e.g., a lower portion) of the inlet 141. A second outlet hole 143*a* may be formed in the second outlet 143 so that the refrigerant may be sprayed toward the second end portion 112*b* of the coil 112. A portion of the second outlet 143 in which the second outlet hole 143*a* is formed may protrude from the outer surface of the shaft 130 and be exposed to the outside of the shaft 130. One or more second outlets 142 may be configured.

The pipe 140 may be connected to a refrigerant tank in which the refrigerant is stored. For example, the inlet 141 of the pipe 140 may be connected to the refrigerant tank to allow the refrigerant to flow in from the refrigerant tank. The inlet 141 of the pipe 140 may be rotatably connected to the refrigerant tank. If the pipe 140 rotates together with the shaft 130, the pipe 140 may be connected to rotate with respect to the refrigerant tank. For example, the inlet 141 of the pipe 140 may communicate with the refrigerant tank by using a ball bearing structure or the like, and may be rotatably connected to the relatively fixed refrigerant tank. The refrigerant may flow into the inlet 141 by pressure of the refrigerant tank and move to the outlets 142 and 143. However, the method of moving the refrigerant based on the pressure of the refrigerant tank is an example, and according to additional or alternative examples, the refrigerant may be introduced using a pump.

The housing 150 may be configured to maintain vacuum therein, and a discharge hole (not shown) through which the refrigerant sprayed through the outlets 142 and 143 is discharged may be formed in the housing 150. For example, the motor 100 may further include a separate device for maintaining vacuum inside the housing 150 in which the discharge hole is formed. The cryogenic refrigerant sprayed through the pipe 140 may be directly sprayed to the coil 112 to cool the coil. For example, if the cryogenic refrigerant is a liquid, the liquid cryogenic refrigerant may be vaporized while coming into contact with the coil having high temperatures, and gas generated due to vaporization may be discharged to the outside of the housing 150 through the discharge hole.

As illustrated in FIGS. 2 and 3, four first outlets 142 and four second outlets 143 may be formed equally and extend from the inlet 141 in a direction perpendicular to the axis of rotation R from the inlet 141, but the shape of the pipe 140 is not limited thereto. According to additional or alternative examples, the number of first outlets 142 and second outlets 143 may be changed in consideration of the performance of the motor 100 and/or the type of refrigerant, and the first outlet 142 and the second outlet 143 may be formed in different numbers. In addition, the first outlet 142 and/or the second outlet 143 may form an obtuse angle or an acute angle that is not perpendicular to the axis of rotation R.

As illustrated in FIGS. 2 and 3, the inlet 141, the first outlet 142, and the second outlet 143 may partially penetrate the shaft 130 and protrude from the shaft 130, but the shape of the pipe 140 is not limited thereto. According to additional or alternative examples, the pipe 140 may be variously modified within a range in which the inlet hole 141*a*, the first outlet hole 142*a*, and the second outlet hole 143*a* communicate with the outside of the shaft 130 to allow the refrigerant to flow in and out.

As illustrated in FIGS. 2 and 3, the inlet hole 141*a*, the first outlet hole 142*a*, and the second outlet hole 143*a* may be formed to have a circular shape, but are not limited thereto. According to additional or alternative examples, the inlet hole 141*a*, the first outlet hole 142*a*, and the second outlet hole 143*a* may be changed into various polygonal shapes, and the inlet hole 141*a*, and the first outlet hole 142*a*, and the second outlet hole 143*a* may be formed to have different shapes.

According to the coil cooling method according to the motor 100, the refrigerant flows into the inlet 141, moves to the first outlet 142 and the second outlet 143, and then flows out through the first outlet hole 142*a* and the second outlet hole 143*a* toward the first end portion 112*a* and the second end portion 112*b* of the coil 112, respectively, to cool the coil 112. In addition, if the rotor 120 rotates, the pipe 140 and the rotor 120 may rotate together, the refrigerant flowing out from the first outlet 142 and the second outlet 143 may be scattered by centrifugal force in the circumferential direction to be smoothly sprayed onto the entire coil 112 surrounding the rotor 120. Through this, the cooling efficiency of the coil 112 may be increased.

Figure 4A:
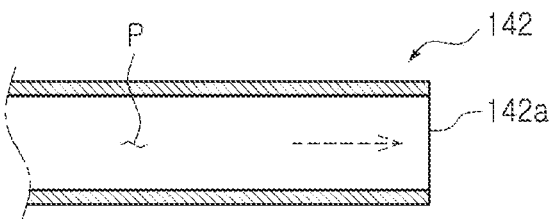
FIGS. 4A, 4B and 4C are cross-sectional views of an outlet of an example motor.
Figure 4B:
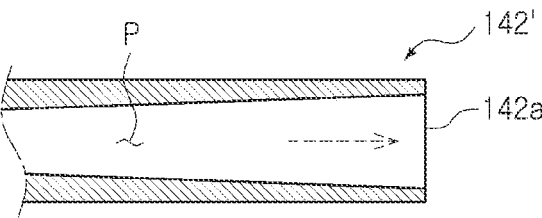
Figure 4C:
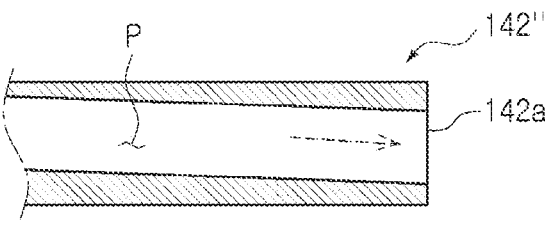

FIGS. 4A, 4B and 4C are cross-sectional views of the outlet 142 of the motor 100. For example, FIGS. 4A, 4B and 4C are diagrams illustrating various modifications of a flow path P through which the refrigerant moves in the first outlet 142, in which FIGS. 4A, 4B and 4C illustrate cross-sections of the first outlets 142, 142', and 142" having flow paths P having different shapes in a length direction. The arrows denoted by the dotted lines in FIGS. 4A, 4B and 4C indicate directions in which the refrigerant flows out.

Hereinafter, the shapes of the flow paths will be described based on the first outlets 142, 142', and 142", but this may also be equally applied to the second outlet (e.g., the second outlet 143 of FIGS. 1 to 3).

Referring to FIGS. 4A, 4B and 4C, the first outlets 142, 142', and 142" may have flow paths (or passages) P for the movement of the refrigerant therein. The flow path P may be formed to have various shapes.

According to the first outlet 142 illustrated in FIG. 4A, the flow path P may have a constant cross-sectional area and be formed in a shape parallel to a direction in which the first outlet 142 extends. For example, an inner wall of the first outlet 142 forming the flow path P may be parallel to an outer wall of the first outlet 142.

According to the first outlet 142' illustrated in FIG. 4B, the flow path P may be formed in a shape in which a cross-sectional area increases toward the first outlet hole 142*a*. For example, the cross-sectional area of the flow path P may gradually increase from a region connected to the inlet (e.g., the inlet 141 of FIGS. 1 to 3) toward the first outlet hole 142*a*. However, the present disclosure is not limited thereto, and the flow path P may be formed in a shape in which the cross-sectional area decreases toward the first outlet hole 142*a*, contrary to FIG. 4B.

According to the first outlet 142" illustrated in FIG. 4C, the flow path P may have a constant cross-sectional area and be formed in a shape inclined at a predetermined angle. For example, an inner wall of the first outlet 142" forming the flow path P may form a predetermined angle with an outer wall of the first outlet 142". An inclination direction of the flow path P may be determined based on a rotation direction of a motor (e.g., the motor 100 of FIGS. 1 to 3). For example, the flow path P having an inclined shape may be applied if the motor 100 rotates in one direction, but is not limited thereto. Also or alternatively, the flow path P may be formed in an inclined shape in which the cross-sectional area increases or decreases.

The size and/or shape of the flow path P of the first outlets 142, 142', and 142" and the first outlet hole 142*a* may be designed considering various factors, such as the amount of heat generated by the motor 100, a quality of the refrigerant, and the required degree of spray of refrigerant.

Another example motor 200 will be described with reference to FIGS. 5 to 7.

Figure 5:
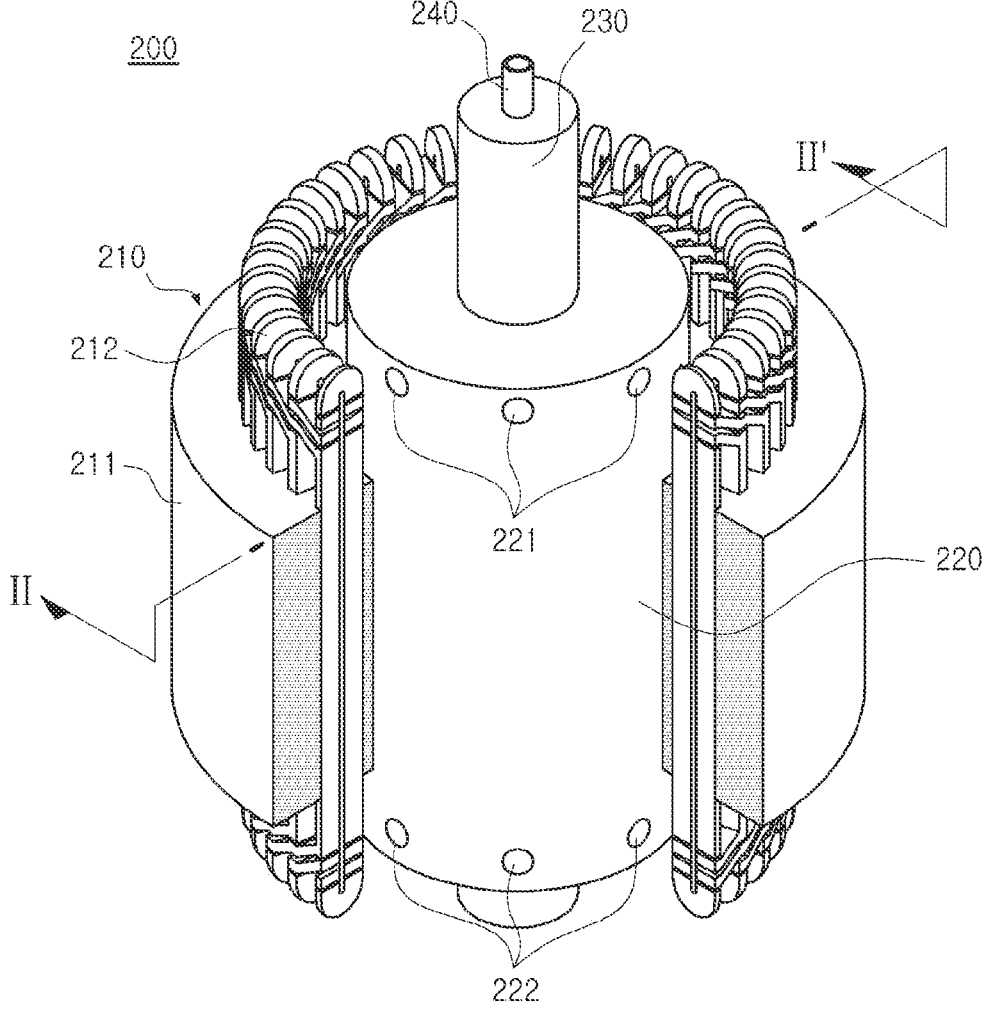
FIG. 5 is a perspective view of another example motor.

FIG. 5 is a perspective view of the motor 200. For example, FIG. 5 is a view in which a portion of a stator 210 is cut to show a structure in which a rotor 220 is disposed inside the stator 210 of the motor 200.

The motor 200 of FIG. 5 is different from the configuration of the motor 100 (e.g., the motor 100 of FIGS. 1 to 3) in which the refrigerant flows out through the outlet (e.g., the outlets 142 and 143 of FIGS. 1 to 3) of the pipe (e.g., the pipe 140 of FIGS. 1 to 3), in that the refrigerant flows out from the rotor 220 by utilizing the rotor 220 as a refrigerant tank, and the other configuration thereof may be the same as or similar to that which is described in reference to the motor 100.

Hereinafter, a description overlapping with the previous description will be omitted and differences will mainly be described.

Referring to FIG. 5, the motor 200 may include the stator 210, the rotor 220, a shaft 230, and a pipe 240. Since the configuration of the stator 210 (the stator core 211 and the coil 212) and the configuration of the shaft 230 are the same as those described above with reference to FIGS. 1 to 3, a description thereof will be omitted.

The rotor 220 may store or accommodate a refrigerant therein, and may discharge the refrigerant located therein externally based on rotation according to driving of the motor 200. A predetermined space in which the refrigerant may be accommodated may be formed inside the rotor 220. Outlet holes 221 and 222 through which refrigerant flows out may be formed on a side surface of the rotor 220. For example, the outlet holes 221 and 222 may penetrate the side surface of the rotor 220. The outlet holes 221 and 222 may include a first outlet hole 221 formed to be adjacent to one end portion of the rotor 220 and a second outlet hole 222 formed to be adjacent to the other end portion of the rotor 220. Each of the first outlet hole 221 and the second outlet hole 222 may be formed as one or more outlet holes. The configuration of the rotor 220 will be described in more detail with reference to FIGS. 6 and 7 below.

The pipe 240 may be inserted into the shaft 230. The pipe 240 may have a hollow shape to enable the inflow, movement, and/or outflow of the refrigerant, and both ends thereof may be open. The refrigerant may flow in through the pipe 240 and be accommodated in a space inside the rotor 220. The pipe 240 may rotate together with the shaft 230 or may be connected to the shaft 230 so as to be separated from rotation of the shaft 230. For example, the motor 200 may be different from the motor 100 in that the pipe 240 is separated from the rotation of the shaft 230. If the pipe 240 is configured to rotate together with the shaft 230, the pipe 240 may be rotatably connected to a refrigerant tank. For example, the pipe 240 may be connected to the refrigerant tank by using a ball bearing structure to rotate with respect to the refrigerant tank if rotating together with the shaft 230.

Figure 6:
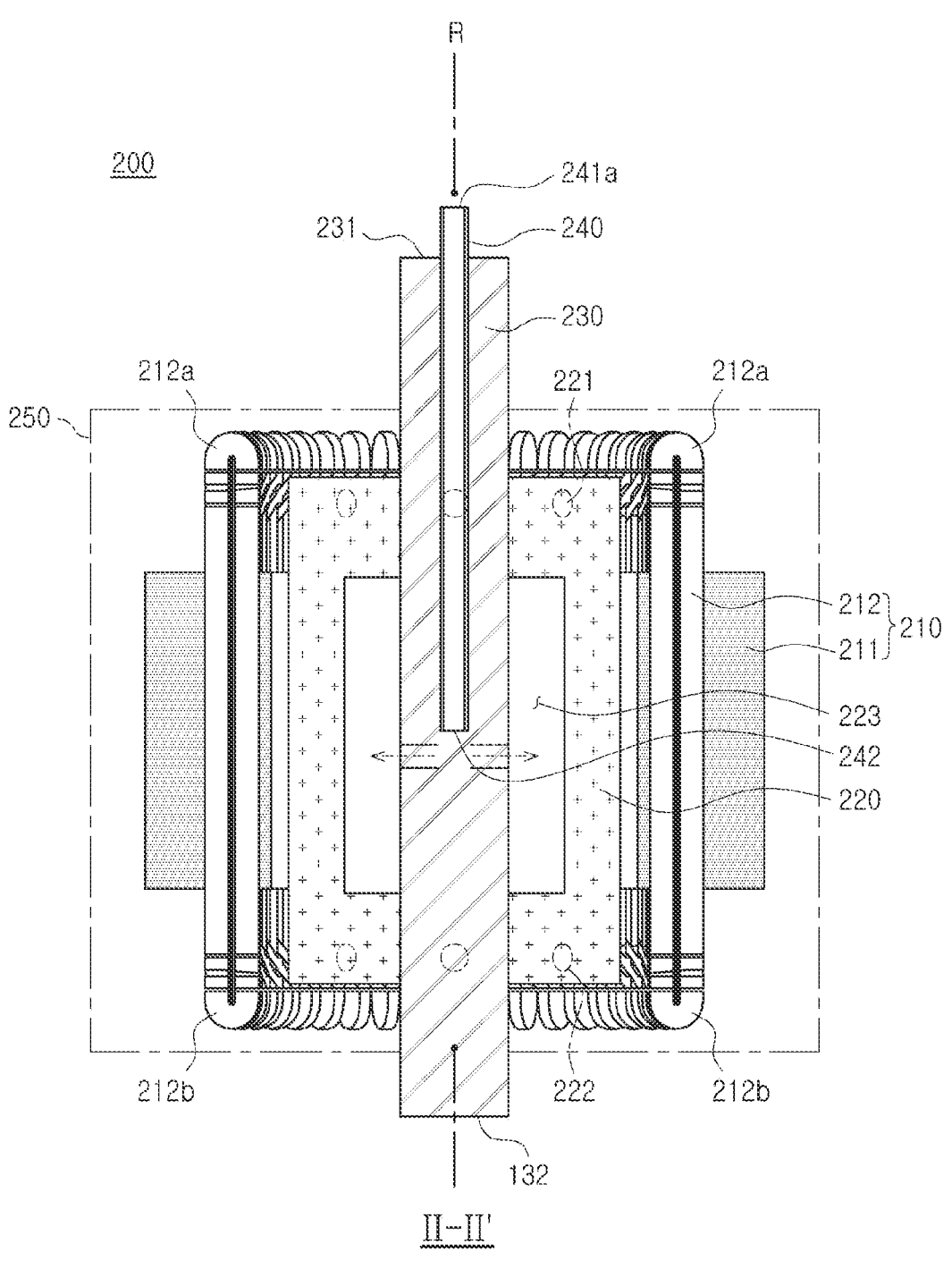
FIG. 6 is a cross-sectional view of the example motor illustrated in FIG. 5.

FIG. 6 is a cross-sectional view of the motor 200 illustrated in FIG. 5. FIG. 7 is a view illustrating the rotor 220, the shaft 230, and the pipe 240 of the motor 200 illustrated in FIG. 5. For example, FIG. 6 is a cross-sectional view taken along line II-II' of FIG. 5, and FIG. 7 is a view illustrating a coupling structure between the rotor 220, the shaft 230, and the pipe 240. FIG. 7 is a view schematically illustrating a housing 250 accommodating other components (e.g., the stator 210, the rotor 220, the shaft 230, and/or the pipe 240) of the motor 200 and/or the pipe 240.

Figure 7:
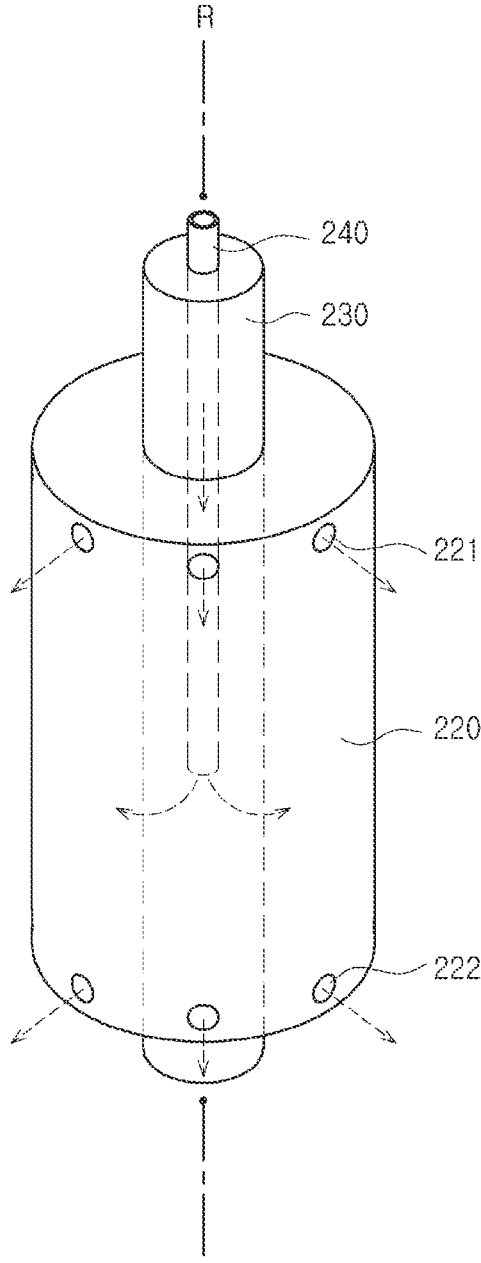
FIG. 7 is a view illustrating a rotor, a shaft and a pipe of the example motor illustrated in FIG. 5.

Referring to FIGS. 6 and 7, the motor 200 may be configured such that the refrigerant is accommodated (or stored) in the rotor 220 and the refrigerant flows out to the coil 212 through outlet holes 221 and 222 formed in the rotor 220 to cool the coil 212.

Hereinafter, in the description of FIGS. 6 and 7, an upper side or an upper portion indicates a direction in which the pipe 240 protrudes from the shaft 230, and a lower side or a lower portion indicates a direction opposite to the upper side or the upper portion.

The pipe 240 may be inserted into the shaft 230. The shaft 230 may include an upper end portion 231 and a lower end portion 232, and a portion of the pipe 240 having an inlet hole 241 may protrude from the upper end portion 231 of the shaft 230. However, the depiction is an example, and the pipe 240 may be changed into various shapes within a range in which the inlet hole 241 formed at the upper end communicates with the outside of the shaft 230 to allow the refrigerant to flow in.

An accommodation space (e.g., a refrigerant chamber) 223 in which the refrigerant is accommodated may be formed in the rotor 220. Although not shown, a permanent magnet (not shown) may be provided in the rotor 220, and the accommodation space 223 may be formed to avoid the permanent magnet. The accommodation space 223 may communicate with the pipe 240 so that the refrigerant may be introduced from the pipe 240. For example, the refrigerant introduced into the pipe 240 may move to the accommodation space 223 through a connection passage (not shown) communicatively connecting the pipe 240 to the accommodation space 223. The configuration for the connection between the accommodation space 223 and the pipe 240 is not limited to the example described above. FIG. 6 schematically illustrates the accommodation space 223 of the rotor 220, and the shapes of the rotor 220 and the accommodation space 223 are not limited to the illustrated examples.

A first outlet hole 221 and a second outlet hole 222 may be formed on a side surface of the rotor 220. Here, the side surface refers to a surface of the rotor 220 facing in a direction, perpendicular to the axis of rotation R. For example, the first outlet hole 221 and the second outlet hole 222 may penetrate the side surface of the rotor 220 toward the coil 212. The first outlet hole 221 and the second outlet hole 222 communicate with the accommodation space 223 to discharge the refrigerant accommodated in the accommodation space 223 to the outside of the rotor 220. In the motor 200, the length of the rotor 220 in a vertical direction may correspond to the length of the coil 220 in the vertical direction in order to form the first outlet hole 221 and the second outlet hole 222 in positions adjacent to both end portions of the coil 212.

The first outlet hole 221 may be formed to correspond to the first end portion 212a of the coil 212. The first outlet hole 221 may be formed on a side surface adjacent to an upper end portion of the rotor 220. The first outlet hole 221 may be formed toward the first end portion 212a of the coil 212, and the refrigerant may be sprayed to the first end portion 212a through the first outlet hole 221. One or more first outlet holes 221 may be configured. For example, the first outlet hole 221 may include a plurality of holes spaced apart from each other at predetermined intervals along the side surface of the rotor 220.

The second outlet hole 222 may be formed to correspond to the second end portion 212b of the coil 212. The second outlet hole 222 may be formed on a side surface adjacent to the lower end portion of the rotor 220. The second outlet hole 222 may be formed toward the second end portion 212b of the coil 212, and the refrigerant may be sprayed to the second end portion 212b through the second outlet hole 222. One or more second outlet holes 222 may be configured. For example, the second outlet hole 222 may include a plurality of holes spaced apart from each other at predetermined intervals along the side surface of the rotor 220.

As illustrated in FIGS. 6 and 7, the first outlet hole 221 and the second outlet hole 222 may be formed in a circular shape, but are not limited thereto. According to additional or alternative examples, the first outlet hole 221 and the second outlet hole 222 may be changed to have various polygonal shapes, and the first outlet hole 221 and the second outlet hole 222 may be formed to have different shapes. Also, the first outlet hole 221 and the second outlet hole 222 may be formed to have different sizes.

As illustrated in FIGS. 6 and 7, the pipe 240 is configured to communicate with the accommodation space 223 of the rotor 220 via the shaft 230 while being inserted into the shaft 230, but is not limited thereto. According to additional or alternative examples, the pipe 240 may be variously modified within a range in which the refrigerant moves to the accommodation space 223 of the rotor 220 through the pipe 240, such that the pipe 240 is directly connected to the accommodation space 223 of the rotor 22, rather than being inserted into the shaft 230.

According to the coil cooling method according to the motor 200, if the rotor 220 rotates in a state in which the refrigerant is accommodated (stored) in the accommodation space 223 of the rotor 220 through the pipe 240, the refrigerant may flow out toward the first end portion 212a and the second end portion 212b of the coil 212 respectively through the first outlet hole 221 and the second outlet hole 222 to cool the coil 212. In addition, as the refrigerant flowing out from the first outlet hole 221 and the second outlet hole 222 is scattered by centrifugal force in the circumferential direction, the refrigerant may be smoothly sprayed to the entire coil 212 surrounding the rotor 220. Through this, the cooling efficiency of the coil 212 may be increased.

According to some example configurations, cooling performance may be improved and motor efficiency may be increased by cooling the coil using a cryogenic refrigerant.

In addition, in some example configurations, the size of the motor may be reduced in response to the improvement of cooling performance, thereby reducing costs and improving power density.

In addition, in some example configurations, since the refrigerant is sprayed by pressure of the refrigerant tank or by centrifugal force according to the rotation of the motor, the cooling structure of the motor may be simplified without a pressure pump.

It may be appreciated that, among other advantages, the motor 10 may be provided with a cooling structure capable of reducing heat in order to prevent damage to the motor and a decrease in efficiency due to heat generation. Additionally the cooling structures may ensure continuous and stable operations of the motor.

Methods for cooling a motor include an air cooling method using air, a water cooling method using cooling water, and an oil cooling method using oil. As the performance of motors has improved, the cooling performance should also be secured, so a direct cooling method using oil has been applied.

However, in recent years, as miniaturization, high output, and high efficiency have been continuously required for motors, it is necessary to secure better cooling performance.

Examples herein describe a motor having a cooling structure capable of cooling a coil of the motor by utilizing a cryogenic refrigerant to improve the cooling performance of the motor.

Examples herein also provide a cooling structure capable of spraying a refrigerant by using pressure of a refrigerant gas or centrifugal force according to rotation of a motor, even without a separate pressure pump for providing a refrigerant.

According to an example configuration, a motor includes a stator with a coil disposed on an inner side thereof, a rotor at least partially surrounded by the coil, a shaft connected to the rotor to rotate integrally with the rotor, and a pipe at least partially inserted into the shaft and through which a refrigerant for cooling the coil flows, wherein the pipe rotates integrally with the rotor and the shaft.

The pipe may include an inlet into which the refrigerant flows from the outside and an outlet connected to the inlet and discharging the refrigerant toward the coil.

The outlet may be formed in positions corresponding to both end portions of the coil.

The outlet may include a first outlet corresponding to an upper end portion of the coil and a second outlet corresponding to a lower end portion of the coil, and each of the first outlet and the second outlet may be formed as one or more outlets.

A magnet or a conductor bar may be disposed inside the rotor, the rotor rotates about an axis of rotation based on electromagnetic interaction between the magnet or the conductor bar and the coil, and the inlet may extend parallel to the axis of rotation, and the first outlet and the second outlet extend, perpendicular to the axis of rotation from the inlet.

An inlet hole communicating with a refrigerant tank supplying the refrigerant may be formed in the inlet, and a first outlet hole and a second outlet hole communicating with the inlet hole may be formed in the first outlet and the second outlet, respectively.

The inlet hole, the first outlet hole, and the second outlet hole may be exposed to the outside of the shaft and communicate with the outside of the shaft.

The inlet may be inserted into the shaft through an upper end portion of the shaft, and the first outlet and the second outlet may protrude from the outer surface of the shaft through the shaft.

The inlet hole, the first outlet hole, and the second outlet hole may have a circular or polygonal shape.

A flow path for the refrigerant to flow therethrough may be formed inside the outlet, and the flow path may include at least one of a shape with a constant cross-sectional area, a shape with a variable cross-sectional area, or an inclined shape.

According to an example configuration, a motor includes a stator with a coil disposed on an inner side thereof, a rotor at least partially surrounded by the coil and having an accommodation space in which a refrigerant for cooling the coil is accommodated, a shaft connected to the rotor to rotate integrally with the rotor, and a pipe communicating with the accommodation space so that the refrigerant is introduced from an external source and the refrigerant flows into the accommodation space therethrough.

The rotor may have an outlet hole communicating with the accommodation space on an outer surface thereof, and the refrigerant accommodated in the accommodation space may flow out to the coil through the outlet hole.

The outlet hole may be formed in positions corresponding to both ends of the coil.

The outlet hole may include a first outlet hole corresponding to an upper end portion of the coil and a second outlet hole corresponding to a lower end portion of the coil, and each of the first outlet hole and the second outlet hole may be formed as one or more outlet holes.

The refrigerant accommodated in the accommodation space may be sprayed toward the coil from the outlet hole based on centrifugal force generated by rotation of the rotor.

The outlet hole may include at least one of a shape with a constant cross-sectional area, a shape with a variable cross-sectional area, or an inclined shape based on a thickness direction of the rotor.

While examples of the present disclosure have been illustrated and described above, it will be apparent to those skilled in the art that modifications and variations could be made without departing from the scope of the present disclosure as defined by the appended claims.

What is claimed is:

1. A motor comprising:
a stator with a coil disposed on an inner side thereof;
a rotor at least partially surrounded by the coil;
a shaft connected to the rotor to rotate integrally with the rotor; and
a pipe at least partially inserted into the shaft and through which a refrigerant for cooling the coil flows,
wherein the pipe rotates integrally with the rotor and the shaft
wherein the pipe comprises an inlet and an outlet,
wherein the outlet comprises a first outlet corresponding to an upper end portion of the coil and a second outlet corresponding to a lower end portion of the coil, and each of the first outlet and the second outlet is formed as one or more outlets,
wherein the first outlet comprises a first outlet hole formed in the first outlet and the second outlet comprises a second outlet hole formed in the second outlet,
wherein the first outlet hole and the second outlet hole are configured to communicate with an inlet hole formed in the inlet, and
wherein the inlet hole, the first outlet hole, and the second outlet hole are exposed to an outside of the shaft and communicate with the outside of the shaft.

2. The motor of claim 1, wherein the refrigerant flows from outside into the inlet, and wherein the outlet is connected to the inlet and configured to discharge the refrigerant toward the coil.

3. The motor of claim 2, wherein the outlet is formed in positions corresponding to both a first end portion and a second end portion of the coil.

4. The motor of claim 2, wherein a flow path for the refrigerant to flow therethrough is formed inside the outlet, and the flow path comprises at least one of a shape with a constant cross-sectional area, a shape with a variable cross-sectional area, or an inclined shape.

5. The motor of claim 1, further comprising a magnet or a conductor bar disposed inside the rotor, wherein the rotor rotates about an axis of rotation based on electromagnetic interaction between the magnet or the conductor bar and the coil, and the inlet extends substantially parallel to the axis of rotation, and the first outlet and the second outlet extend substantially perpendicular to the axis of rotation from the inlet.

6. The motor of claim 1, wherein:
the inlet hole is configured to communicate with a refrigerant tank supplying the refrigerant.

7. The motor of claim 6, wherein the inlet is inserted into the shaft through an upper end portion of the shaft, and the first outlet and the second outlet protrude from an outer surface of the shaft through the shaft.

8. The motor of claim 6, wherein the inlet hole, the first outlet hole, and the second outlet hole have a circular or polygonal shape.

9. The motor of claim 1, wherein the refrigerant is a cryogenic refrigerant comprising liquid nitrogen or liquid hydrogen.

10. A motor comprising:
a stator with a coil disposed on an inner side thereof;
a rotor at least partially surrounded by the coil;
a shaft connected to the rotor to rotate integrally with the rotor; and
a pipe at least partially inserted into the shaft and through which a refrigerant for cooling the coil flows,
wherein the pipe rotates integrally with the rotor and the shaft
wherein the pipe comprises an inlet and an outlet,
wherein the outlet comprises a first outlet corresponding to an upper end portion of the coil and a second outlet corresponding to a lower end portion of the coil, and each of the first outlet and the second outlet is formed as one or more outlets, and
wherein the inlet is inserted into the shaft through an upper end portion of the shaft, and the first outlet and the second outlet protrude from an outer surface of the shaft through the shaft.

11. The motor of claim 10, wherein:
an inlet hole of the inlet is configured to communicate with a refrigerant tank supplying the refrigerant.

12. The motor of claim 10, wherein the refrigerant flows from outside into the inlet, and wherein the outlet is connected to the inlet and configured to discharge the refrigerant toward the coil.

13. The motor of claim 10, wherein the refrigerant is a cryogenic refrigerant comprising liquid nitrogen or liquid hydrogen.

* * * * *